April 21, 1959 — B. M. SMALLEY — 2,883,136
SUPPORT FOR ELECTRICAL DEVICES
Filed Jan. 30, 1957 — 3 Sheets-Sheet 1

INVENTOR.
Burton M. Smalley
BY
Mason, Kolehmainen, Rathburn and Wyss
Attorneys.

April 21, 1959  B. M. SMALLEY  2,883,136
SUPPORT FOR ELECTRICAL DEVICES
Filed Jan. 30, 1957  3 Sheets-Sheet 2
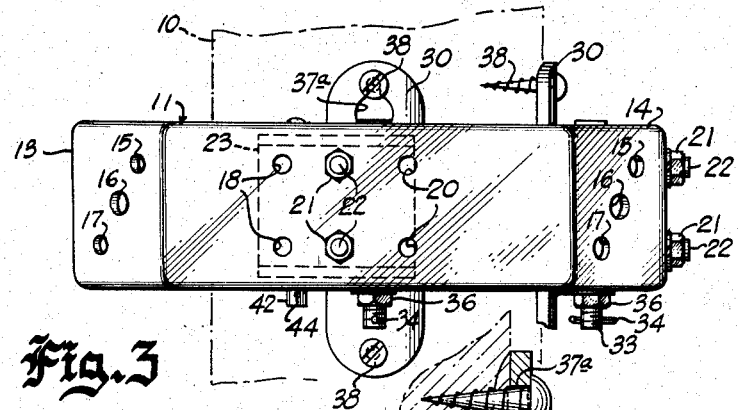
Fig. 3
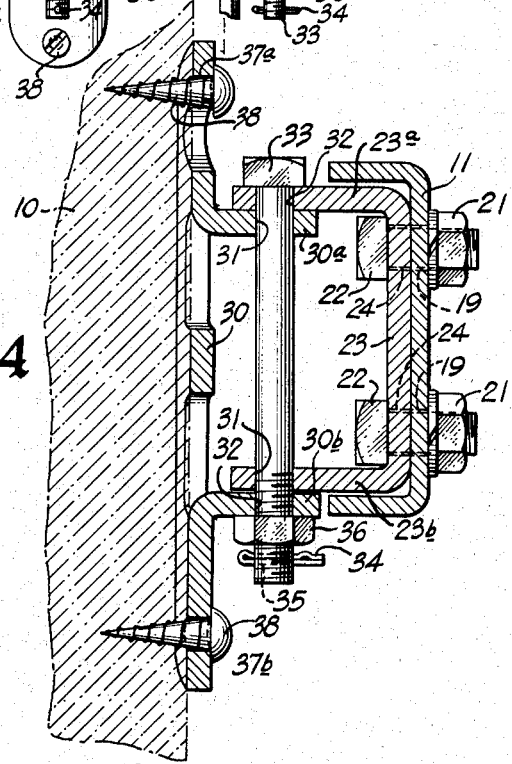
Fig. 4
Fig. 5
INVENTOR.
Burton M. Smalley
BY
Mason, Kolehmainen, Rathburn and Wyss.
Attorneys.

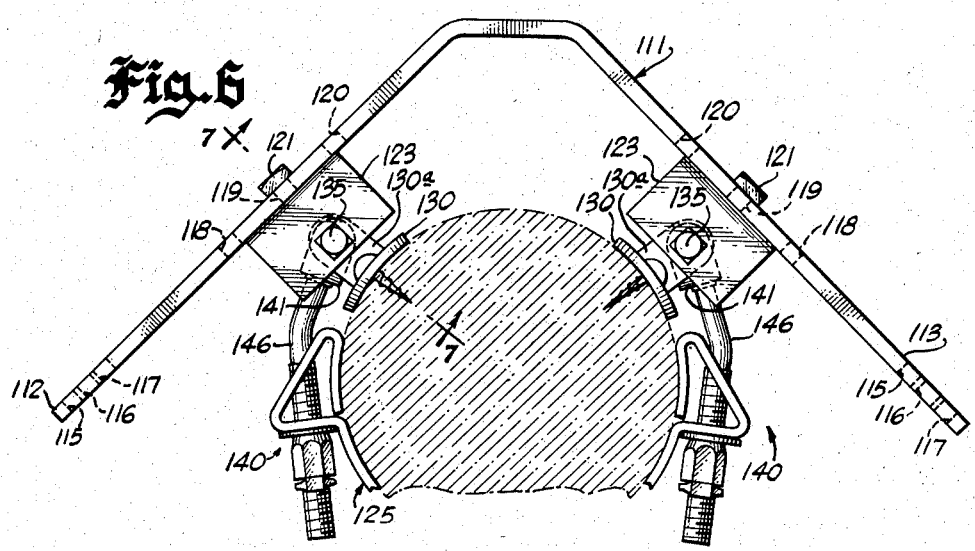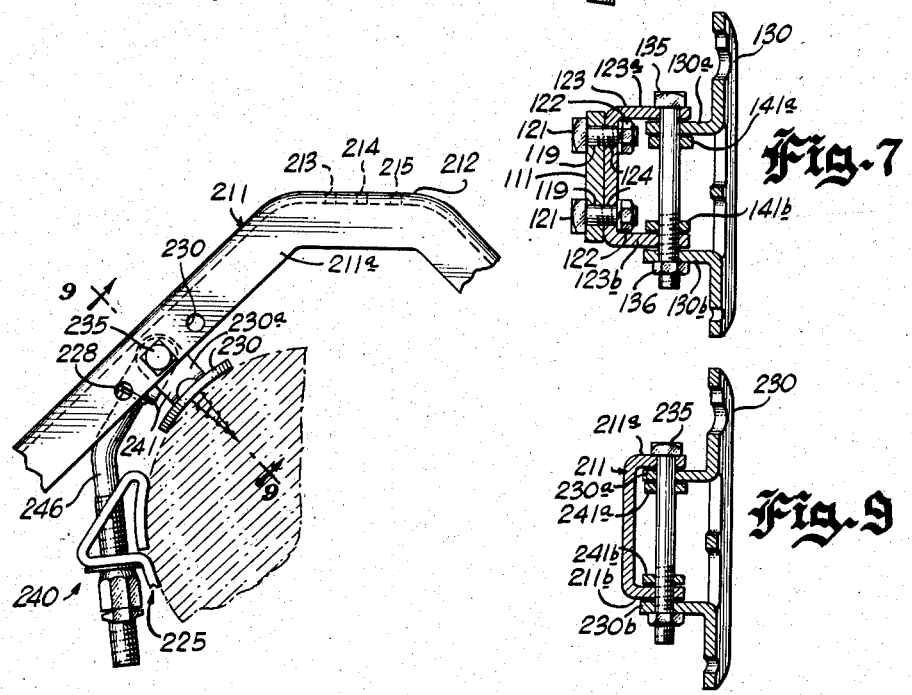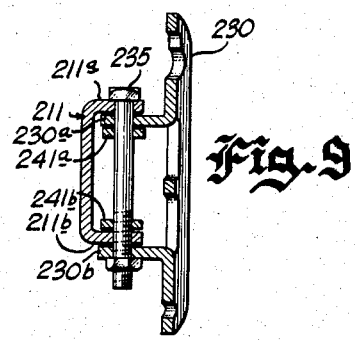

United States Patent Office 2,883,136
Patented Apr. 21, 1959

2,883,136

SUPPORT FOR ELECTRICAL DEVICES

Burton M. Smalley, Highland Park, Ill., assignor to Joslyn Mfg. & Supply Co., Chicago, Ill., a corporation of Illinois Application January 30, 1957, Serial No. 637,311

11 Claims. (Cl. 248—230)

The present invention relates generally to a support for electrical devices and particularly to a support for mounting one or more electrical devices at an elevated location on a telephone pole or the like. It is, specifically, an improvement on the cluster support disclosed and claimed in my copending application, Serial No. 481,581, filed January 13, 1955, and assigned to the same assignee as the present invention.

Many different types and sizes of distribution transformers and capacitors have been manufactured to satisfy the multitude of needs in various electrical distribution systems. Generally, the physical size, weight and configuration of these electrical devices vary in accordance with their kva. or their kvar. ratings, respectively. However, regardless of the size of the electrical devices, they usually include a plurality of mounting legs extending outwardly from the casing for attachment to mounting faces of a cluster support. Accordingly, various types of cluster supports have been manufactured which vary according to the weight and size of the electrical devices with which they are to be used.

In an attempt to reduce the number and type of supports for electrical devices, there have been developed, as described in the above-identified copending application, three basic sizes of cluster supports, each of which has a limited range of adjustability to permit its use with poles having diameters within a limited range. It has been necessary, therefore, to manufacture, store and transport three sizes of supports in order to insure that a support is available for use with any diameter pole conventionally used in power distribution systems. Moreover, it has been found that if a non-adjustable support or a support having limited adjustability is used on a pole having a diameter outside of the recommended range, high stresses are developed in the support which tend to reduce the capacity of the support and decrease its useful life.

Therefore, it would be desirable to provide a single support which is readily adjustable throughout a wide range so that it may be used with any pole of the type conventionally used in electrical distribution systems. Moreover, it would be further desirable to provide this support with interchangeable components so as to permit attachment thereto of electrical devices of various shapes and sizes.

It is, accordingly, an object of the present invention to provide a new and improved support embodying the desirable features described above.

It is another object of the present invention to provide a single support which is readily adaptable for mounting at an elevated location on poles having different diameters and conventionally used in electrical distribution systems of the like.

It is still another object of the present invention to provide an improved support embodying adjustable and interchangeable components for supporting one or more electrical devices on a pole of the type conventionally used with electrical distribution systems irrespective of the diameter of the pole.

A further object of the present invention is to provide new and improved means for selectively orienting the components of a support in accordance with the diameter of the pole to which the support is to be secured and to provide new and improved means for supporting the components which fixedly secure the support to the pole.

The above and other objects are achieved in accordance with the present invention by providing an electrical device support comprising a bracket having one or more mounting faces for supporting a corresponding number of electrical devices 90 degrees oriented relative to one another. The support is adapted to be preadjusted in accordance with the diameter of a supporting pole to which it is to be mounted so that it may be easily assembled at a designated elevation on the pole. In this connection, intermediate means are adjustably positioned along the web of the bracket in preselected positions, which means has pivotally connected thereto both pole engaging feet and the ends of a universal band assembly adapted to be altered in length such that it may be wrapped around approximately one-half of the peripheral surface of the pole. Moreover, by virtue of the adjustability of the support, components of the clamping forces developed to fixedly secure the support to the pole substantially reinforce one another, thereby to avoid the creation of any excessive internal stresses.

The invention both as to organization and method of operation, together with further objects and advantages thereof, will best be understood by reference to the following description, taken in connection with the accompanying drawings, in which:

Fig. 3 is a sectional view taken along line 3—3 of Fig. 2;

Fig. 4 is an enlarged sectional view taken along line 4—4 of Fig. 2;

Fig. 5 is an enlarged sectional view taken substantially along line 5—5 of Fig. 2;

Fig. 6 is a top plan view of another embodiment of the electrical device cluster support illustrating another intermediate member and a bracket adapted for mounting two electrical devices;

Fig. 7 is a sectional view taken along line 7—7 of Fig. 6;

Fig. 8 is a top plan view of yet another embodiment of the present invention illustrating yet another intermediate member and yet another bracket for mounting a single electrical device; and Fig. 9 is a sectional view taken along line 9—9 of Fig. 8.

Figures 1, 2:
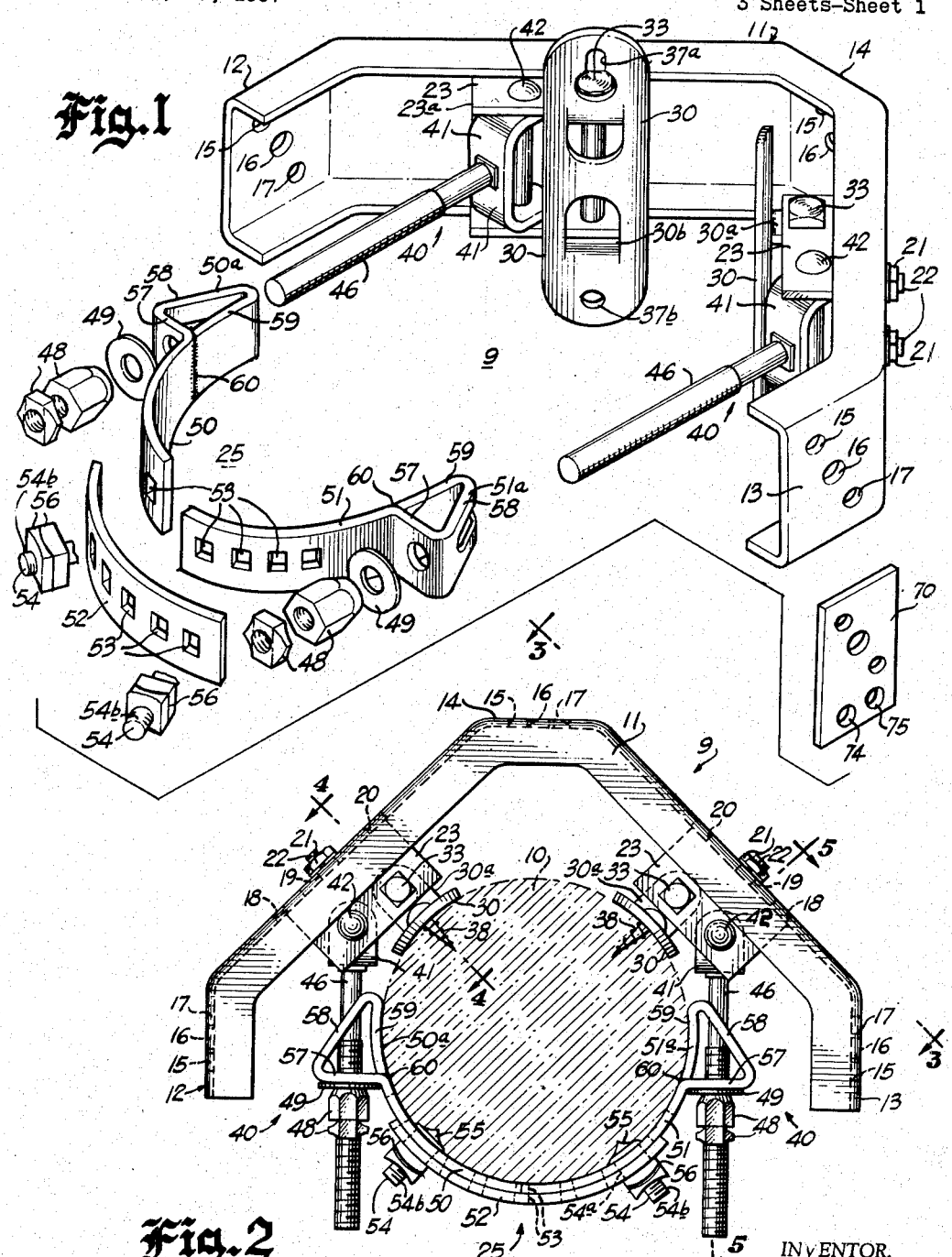
Fig. 1 is an exploded perspective view of an electrical device cluster support embodying the features of the present invention.
Fig. 2 is a top plan view of the support of Fig. 1, shown assembled and mounted on a pole.

Referring now to the drawings and more particularly to the embodiment of the invention disclosed in Figs. 1 through 5 thereof, an electrical device support 9 principally comprises an arcuate bracket 11 which is carried by a pair of intermediate members 23. Each of the members 23, in turn, is pivotally supported by a pole engaging foot 30 which is adapted to be lag screwed at a preselected elevation on a supporting pole 10. By virtue of the pivotal attachment between the feet 30 and the intermediate members 23, the faces of the feet 30 may be adjusted to lie approximately flush with the surface of the pole, thereby insuring a large frictional contact surface between the feet 30 and the pole 10. Moreover, the intermediate members 23 are adjustably positioned relative to the bracket 11 to accommodate more readily the diameter of the pole on which the support 9 is mounted, whereby the feet 30 may be spaced apart by an arc of approximately 120 degrees and a clamping means 40, which is pivotally supported on said intermediate members 23 for connecting a universal band assembly 25 thereto, may be at all times spaced apart from both the pole 9 and the feet 30. By virtue of the adjustability of the cluster support 9, a component of the clamping force developed by the coaction of the universal band assembly 25 and clamping means 40 is coincident with and reinforces the force developed by the lag screws relative to the feet 30 to prevent withdrawal of the lag screws from the pole under the weight of the electrical devices carried by the support 9.

Considering the cluster support 9 in greater detail, the bracket 11 is of channel construction and has a plurality of mounting faces 12, 13 and 14 provided at spaced apart locations on the web thereof. In the embodiment of the invention illustrated in Fig. 1 the faces 12, 13 and 14 are spaced apart by 90 degrees. Therefore, three electrical devices may be mounted on the support 9. Each of the faces 12, 13 and 14 is provided with three diagonally arranged apertures 15, 16 and 17 to accommodate one of a pair of mounting lugs of various electrical devices, e.g., transformers or capacitors, or to accommodate conventional fastening means (not shown) adapted to secure adapter plates 70 (only one of which is shown) to the faces 12, 13 and 14. The plates 70, in turn, are provided with a plurality of apertures 74 and 75 to accommodate the mounting lugs of the electrical devices.

In order that the electrical device cluster support may be readily adaptable for use with poles of different diameters, and in accordance with a feature of the present invention, each intermediate member 23 is adjustably positioned relative to the bracket 11. To this end and as best shown in Fig. 3 there is defined on the web of the bracket 11 intermediate the mounting faces 12, 13 and 14, three pairs of vertically aligned apertures 18, 19 and 20. Each set of the apertures 18, 19 or 20 is adapted to receive a pair of bolts 21 which coact with nuts 22 to secure, respectively, an intermediate channel member 23 to the bracket 11. More specifically, each intermediate member 23 is of channel configuration and is so dimensioned that it is nested within the channel bracket 11. In addition, the web of each member 23 has defined therein a pair of apertures 24, which, when in registry with a selected pair of apertures 18, 19 or 20, accommodates the bolts 21, with the result that each intermediate member 23 is maintained in predetermined position relative to the bracket 11 with its web and flanges adjacent to the web and flanges of the bracket 11.

Hence, the disposition of the intermediate members 23 in selective positions relative to the bracket 11 in cooperation with an adjustable universal band assembly 25, described hereinafter, enables the cluster support 9 to be used with all of the different diameter poles encountered in electrical distribution networks. In addition, the intermediate member 23 provides a base from which the ends of the band assembly 25 are pivotally supported and to which the feet 30 are pivotally mounted to space the bracket 11 from the pole 10 in order to facilitate attachment of the electrical devices to the pole without obstruction of the pole.

As shown in Figs. 1 and 2, in order fixedly to secure the bracket 11 to the pole 10, the elongated feet 30 are pivotally attached to respective ones of the intermediate members 23. The pivotal attachment is provided by means of lug portions 30a and 30b which extend outwardly from each foot 30 intermediate the ends thereof. These lugs may conveniently be integral portions of the feet 30 struck out at forging temperatures or they may be separate members welded to the feet. The lugs 30a and 30b of each of the elongated feet 30 are provided with apertures 31 adapted to register with aligned apertures 32 in the flanges of the member 23 to accommodate a stud 33. Each stud 33 is carried parallel to the longitudinal axis of the pole 10 by the pivoted support feet 30 and functions to support the intermediate member 23 therefrom. It will be appreciated that because the weight of the electrical devices carried by the support 9 is transmitted through the studs 33, only a sheer stress is created, and, accordingly, each stud 33 may conveniently be held in place at its top by means of its headed portion abutting against the lug 30a and at its bottom by nuts 36 threaded thereon and abutting against the lug 30b. In addition, to prevent disassembly of the stud 33 and the foot 30 in the event the nuts 36 are loosened, a cotter pin 34 is inserted through an associated aperture 35 in the stud 33. In order that the weight of the electrical devices is substantially equally distributed between the upper and lower outstanding lugs 30a and 30b of the pivoted feet 30, the upper flange 23a of each intermediate member 23 is located above the upper lug 30a of each pivoted foot 30, and the lower flange 23b of each intermediate member 23 is positioned above the lower lug 30b.

In order fixedly to secure the pivotal feet 30 to the pole 10, each is provided with a pair of apertures 37a and 37b, the upper one 37a being of keyway shape so that each foot 30 may be hung initially on a single lag screw 38 partially driven into the pole. The lag screw 38 in the keyway aperture 37a and another screw 38 inserted through the aperture 37b are adapted to be tightened to draw the feet 30 flush against the pole surface (Figs. 2 and 4). The face portion of each of the feet 30, which is adapted to abut against the peripheral surface of the pole 10, is concave to substantially conform to the associated pole surface of pole sizes commonly used in distribution systems.

To provide additional means for securing the bracket to the pole 10 and thus relieve the stress exerted by the feet 30 on the lag screws 38, a universal band assembly 25, of the type disclosed and claimed in my above-identified copending application, is partially wrapped around the pole 10 and is connected to the intermediate members 23 by clamping means 40.

Briefly, the universal band assembly 25 is generally similar to the band assembly 25 described in detail in my above-identified copending application and includes a pair of arcuate metallic bands 50 and 51 for engaging the pole 10. However, in contrast to the band assembly in my above copending application, an extension band 52 is provided for overlapping the bands 50 and 51, as shown in Fig. 2. Each of the bands 50, 51 and 52 is provided with a plurality of square apertures 53 which are equally spaced apart so that when the bands 50, 52 and 51, 52 are overlapped, as shown in Fig. 2, the apertures 53 may be in registry to receive a pair of studs 54. Each stud 54 is provided with a square cross-sectioned body portion 54a conforming to the shape of the apertures 53 and an enlarged conical head 55 which is adapted to be driven into the pole incident to tightening of the clamping means 40. Pairs of locking nuts 56 are threaded onto a threaded end 54b of each stud 54 to coact with each enlarged head 55 to secure the overlapping bands 50, 52 and 51, 52 in fixed relationship. In order to attach the universal band assembly 25 to the clamping means 40, one end of the bands 50 and 51 is deformed to provide outstanding triangularly shaped ears 50a and 51a. Each of the ears 50a and 51a comprise a first and second leg 57 and 58, apertured as shown to accommodate the clamping means 40, and a third leg 59 secured by means of a weld or the like at 60 to the band.

The clamping means 40 function to pivotally attach the ends of the universal band assembly 25 to a different one of the intermediate members 23 and to transmit a clamping force developed by the band assembly 25 and clamping means 40 to the members 23, which force is substantially coincident with the clamping force provided by the lag screws 38. Specifically, each clamping means 40 includes a pivot bracket 41 which is pivotally secured to the intermediate member 23 by means of a stud 42 disposed within aligned apertures 23c in the flanges 23a and 23b of the intermediate member 23 and in the aligned apertures 41c of the flanges 41a and 41b of the pivot bracket 41. Since there is only a sheer stress on each of the bolts 42, it may be conveniently held in place at the top by means of a headed end portion 42a abutting against the flange 23a and at the bottom by a cotter pin 44 inserted through an associated aperture 45 in the bolt 42 and adapted to abut against the flange 23b. In order to interconnect the ends of the universal band assembly 25 with respective ones of the pivot brackets 41, a pair of clamping bolts 46 are respectively inserted through apertures 47 located centrally of the webs 41a of the pivot brackets 41 such that the enlarged head portions 46a are seated under clamping tension against the surfaces of the webs of the brackets 41. The shanks of the bolts 46 are inserted through the apertured legs 57 and 58 of different ones of the ears 50a and 51a to threadedly receive pairs of locking nuts 48 and apertured plates 49, which plates 49 are positioned in abutting engagement against different ones of the first legs 57 of the ears 50a and 51a. It will be appreciated that by tightening of the locking nuts 48 relative to the bolts 46 the universal band assembly 25 and the intermediate members 23 are drawn together under clamping tension with the result that the cone headed studs 54 are driven into the pole 10. By this arrangement, the pivotal feet 30 are drawn against the pole surface to provide additional force to oppose the withdrawal of the lag screws 38 under the weight of the electrical devices carried by the support 9.

Considering now the adjustability feature of the bands 50, 51 and 52 of the universal band assembly 25, it will be understood that if the cluster support 9 is to be used with a medium sized pole the assembly 25 is adjusted to its medium length, i.e., the ends of the bands 50 and 51 are disposed in abutting relationship and the band 52 superimposed over the bands 50 and 51, as illustrated in Fig. 2, whereby the studs 54 are inserted through aligned apertures 53 and secured in place by the locking nuts 54. However, when the cluster support is to be used with poles of large diameter, the assembly 25 is adjusted to its maximum length, i.e., the bands 50 and 51 are spaced apart and interconnected by the band 52 which has only its end portions superimposed upon the bands 50 and 51. On the other hand, when the cluster support 9 is to be used with a pole having a small diameter, the assembly 25 is adjusted to its minimum length, i.e., the band 52 is not used and the bands 50 and 51 are overlapped. Therefore, by this expansible arrangement the universal band assembly 25 may be preadjusted in accordance with the diameter of the pole to which the support 9 is to be mounted such that the bands extend around approximately 50% of the pole circumference, thereby to properly orient the ears 50a and 51a to accommodate the bolts 46 without interference from the pole 10. Moreover, it will be appreciated that when the support 9 is to be used with a pole having a medium-sized diameter, each intermediate member 23 is fastened to the bracket 11 by the bolts 21 extending through the centrally disposed pairs of apertures 19 such that the clamping bolts are spaced slightly from the pole when attached to the ends of the universal band assembly 25, as shown in Fig. 2. Accordingly, when the support 9 is to be used with either a pole of large or small diameter, the intermediate members 23 are fastened to the bracket 11 by bolts 21 extending through the pairs of apertures 18 and 20, respectively, whereby the clamping bolts 46 are maintained in the same relative position as described above.

In use, the electrical device cluster support 9 is taken into the field in disassembled condition for mounting at an elevated location on a designated pole. The diameter of the pole to which the cluster support is to be secured is measured in order to determine the positioning of the intermediate members 23 relative to the bracket 11 and to determine the required length of the universal band assembly 25. Suitable indicia identifying relative positions of the members 23 for particular pole diameter ranges may be located adjacent the sets of apertures 18, 19 and 20 to facilitate correct positioning of the members 23 relative to the bracket 11. Similarly, suitable indicia identifying lengths of the universal band assembly 40 for particular pole diameters may be mounted on the bands 50, 51 and 52 to facilitate proper assembly of the band assembly 25. The bracket 11, to which is secured the intermediate members 23, is elevated to the desired position on the pole. The feet 30 are manually pivoted into a position wherein the curved surfaces thereof lie substantially flat against the surface of the pole. The lag screws 38 are then inserted in the apertures 36 and are driven into the pole to support the bracket 11 in the desired position. As an alternative procedure of mounting the feet 30, the desired location of the screws 38 may be marked, the support 9 removed from the pole 10, the upper screws 38 driven partially into the pole 10 and the feet 30 positioned on the pole 10 such that the screws 38 are inserted through the keyhole apertures 37. By this arrangement, the feet 30 may be rested on the screws 38 while the screws are driven completely into the pole 10. The universal band assembly 25, being adjusted in length to have an arc of approximately 180 degrees to the pole's circumference, is then mounted on the pole 10 so that the ears 50a and 51a engage the clamping bolts 46. The clamping nuts 47 are threaded into the bolts 46 and tightened, whereby the inner surfaces of the bands 50 and 51 are drawn into engagement with the periphery of the pole and the heads of the studs 54 are driven into the pole 10.

Manifestly, the support 9 is maintained in the selected position on the pole by the force of the lag screws 38 acting through the feet 30 on the bracket 11 and by the cooperative force of the band assembly 25 and clamping means 40. In fact, regardless of the pole diameter, the force exerted by the lag screws 38 on the feet 30 is directed substantially radially of the pole 10 along lines intersecting at approximately 120 degrees and a component of the force developed by the clamping means 40 is directed so as to reinforce the force of the lag screws 38.

As indicated before, the electrical device support 9 is designed to accommodate electrical devices of various sizes, such, for example, as transformers rated from 15 kva. to 100 kva. load capacity. The 15 kva. transformers, for example, are generally provided with two mounting lugs arranged on twelve inch centers, one above the other. To mount a plurality of 15 kva. transformers on the cluster support 9, only a single cluster support 9 is needed, but it must be modified by the addition of adapter plates 70 to its mounting faces 12, 13 and 14. Each of these plates 70 has a plurality of diagonally located holes 71, 72 and 73, corresponding in location to the apertures 15, 16 and 17 in each of the support faces 12, 13 and 14, to accommodate suitable fasteners (not shown) for fixedly securing the plates 70 to the faces 12, 13 and 14. Each adapter plate 70 is further provided with a pair of vertically spaced apertures 74 arranged on twelve-inch centers for receiving the mounting lugs of the 15 kva. transformers to be supported thereon. By the use of three adapter plates 70, three 15 kva. transformers may be mounted in positions displaced 90 degrees from one another on the cluster support 9 mounted on the pole as described above.

Distribution transformers which have a rating of 25, 37½ or 50 kva. are usually provided with two vertically arranged mounting lugs on twenty-four inch centers. Because transformers in this range of sizes are relatively heavy, it has been found desirable to support them by two supports 9 arranged on the pole, one above the other, on twenty-four inch centers. With such an arrangement no adapted plates are necessary and the vertically aligned central apertures 16 in the corresponding support faces of two vertically spaced support brackets 11 may be used directly to accommodate the mounting lugs of a transformer.

In accordance with another embodiment of the present invention, illustrated in Figs. 6 and 7, the pivotal feet 30 and the clamping means 40, instead of being supported on separate bolts 33 and 42, respectively, are supported by a single bolt. Moreover, a bracket 111 is deformed into a generally V-shaped configuration from a flat plate instead of a channel. As shown, the bracket 111 is adapted to support two electrical devices by a pair of mounting faces 112 and 113 disposed at its ends. Defined in the mounting faces 112 and 113 are a plurality of apertures 115, 116 and 117 for accommodating the fastener means used to secure the electrical devices to the bracket 111. Similar to the first embodiment, the bracket 111 is supported by a pair of intermediate members 123 which are adjustably attached in selective positions to the bracket 111. To this end, three pairs of vertically aligned apertures 118, 119 and 120 are defined equidistantly between each end and the center of the bracket 111, which pairs of apertures 118, 119 and 120 are selectively adapted to register with a pair of apertures 124 in each member 123 to accommodate bolts 121 and associated nuts 122, as best shown in Fig. 7. It should be noted that since the bracket 111 is made from flat plate, no nesting or interfitting relation exists between the bracket 111 and the members 123.

Similar to the first embodiment described above, pivotal feet 130 and locking means 140 are pivotally secured to different ones of the intermediate members 123. However, instead of each foot 130 and each clamping means 140 being pivotally supported by a separate bolt, each pivotal foot 130 and clamping means 140 is pivotally supported on each intermediate member 123 by a single bolt 135. The pivotal feet 130 are constructed identically with the pivotal feet 30 of the first embodiment, and likewise include pairs of lugs 130a and 130b which extend outwardly from the feet intermediate the ends thereof. In addition, the clamping means 140 is identical with the clamping means 40 of the first embodiment and each includes a clamping bolt 146 connected to a U-shaped pivot bracket 141 which has its flanges 141a and 141b suitably apertured. Of course, the locking means 140 functions to connect a band assembly 125, identical to the band assembly 25 of the first embodiment, to the intermediate member 123.

The position of each pivotal foot 130 and each pivot bracket 141 relative to each bolt 135 is best shown by reference to Fig. 7. Specifically, the upper and lower flanges 123a and 123b of each intermediate member 123 are located above the upper and lower lugs 130a and 130b respectively of each pivoted foot 130. Additionally, the flange portions 141a and 141b of each pivot bracket 141 are located respectively beneath the upper lug 130a of each pivoted foot 130 and immediately above the lower flange 123a of each intermediate member 123. The intermediate member 123, the pivotal foot 130 and the pivot bracket 141 are suitably apertured to accommodate, when assembled as shown in Fig. 7, the assembly bolt 135. The bolt 135 is simply held in place at its top by means of its headed end portion 135a coacting with the upper flange 123a of the intermediate member 123 and at its bottom by a nut 136 threaded into engagement with the lower surface of the lower flange 130b of the foot 130.

To prevent contacting engagement of each clamping bolt 146 with either the pivotal foot 130 or the pole 10, the clamping bolts 146 are slightly deformed outwardly from the pole. However, each bolt 146 is interconnected between an end of the universal band assembly 125 and one pivot bracket 141 in the manner described above. Hence, with the universal band assembly 125 wrapped around approximately half of the pole 10, the bolts 146 are always spaced from the pole regardless of the position of the members 123 relative to the bracket 111.

In accordance with yet another embodiment of the present invention, illustrated in Figs. 8 and 9, each intermediate member is eliminated and a single adjustable bolt means is employed as intermediate means to support both one pivotal foot and one clamping means directly from the bracket. This embodiment comprises a channel bracket 211 having a generally arcuate configuration provided with a single mounting face 214 equidistant its ends for supporting thereto a single electrical device. Defined in the mounting face 212 are a plurality of apertures 213, 214 and 215 for accommodating either the mounting lugs of a conventional electrical device or the fastener means for the adapter plates 70.

The bracket 211, as are the brackets in the above-described two embodiments, is spaced from the pole 10 and to this end has defined in its flanges, not its web as in the above-described brackets, pairs of aligned apertures 228, 229 and 230 which are located equidistant between its center and each of its ends. A single bolt 235 is adapted to be disposed in selected pairs of the apertures 228, 229 and 230 in accordance with the desired adjustment of the support 9. Hence, instead of the bolt 235 being supported from an intermediate member, it is supported directly from the channel bracket 211. To each bolt 235 is pivotally attached a pivotal foot 230 and a clamping means 240 which are identical to the above-described pivotal feet and clamping means.

As specifically illustrated in Fig. 9, in order to distribute the weight of the transformers equally between the upper and lower outstanding lugs 230a and 230b of the pivotal feet 230, the upper flange 211a of the bracket 211 is located above each of the lugs 230a and the lower flange 211b of the bracket 211 is located above each of the lugs 230b. In addition, each of the pivotal brackets 241 of the clamping means 240 has its upper flange 241a located beneath a different one of the lugs 230a and has its lower flange 241b located above a different one of the lower flanges 211b of the bracket 211. Similar to the immediately above-described embodiment, clamping bolts 246 are slightly deformed outwardly of the pole to prevent engagement thereof with either the pivotal feet 230 or the pole 10. However, each bolt 246 is interconnected between one of the pivot brackets 241 and an end of the band assembly 240 in a manner described above, the band assembly 225 being identical with the above-described band assemblies 25 and 125.

Considering now the brackets 11, 111 and 211, it will be understood that in the first above-described embodiment either the bracket 111 or the bracket 211, modified to include apertures similar to the sets of apertures 18, 19 and 20 in the bracket 11, may be substituted for the bracket 11, whereby a cluster support is provided having a number of mounting faces corresponding to the number of electrical devices desired to be mounted on the pole. Thus, interchangeable brackets may be used in the first above-described embodiment with the attendant advantage that a bracket of optimum size may always be used. Moreover, the bracket 111 in the second above-described embodiment may be modified to have only one mounting face instead of the mounting faces 112 and 113. In this connection, the ends of the bracket 111 may be cut off and the apertures 115, 116 and 117, which accommodate the mounting lugs of the electrical devices, may be drilled in the portion of the bracket equidistant its cut ends.

Furthermore, it will be understood that the first above-described embodiment may be modified to eliminate the intermediate members 23. To this end, there may be defined in the flanges equidistant the apex and ends of the bracket two sets of apertures each set of which is adapted to accommodate one of the studs 33 or 42. Thus, each foot 30 and clamping means 40 is adjustably carried by the bracket, but is supported from a separate pivot means instead of the common intermediate member 23. By this arrangement, irrespective of a pole diameter, the feet 30 may be spaced 120° apart and the clamping means 40 may be spaced from the pole and disposed in parallel relationship.

It will be appreciated that in accordance with the above-described embodiments of the present invention, there has been provided an electrical device cluster support which is adaptable for use with poles of different diameters conventionally used in electrical distribution systems. By adjustably positioning the intermediate members relative to the bracket and by adjusting the effective length of the universal band assembly, the support is readily adaptable for use with any pole such that the clamping forces developed by the band assembly and its pivotal feet screws cooperate to rigidly secure the support to the pole. In addition, the adjustable intermediate means provides for pivotal attachment thereto of pivotal feet adapted to be fixedly secured to the pole and clamping means adapted to tighten the band assembly around the pole relative to the intermediate means. Moreover, if prior to assembly the number of electrical devices desire to be supported from a pole is known, a bracket with the corresponding number of mounting faces may be selected, thereby avoiding the use of a larger bracket than is necessary.

While there have been described several embodiments of the present invention, it will readily be understood that numerous changes and modifications may be made which will readily occur to those skilled in the art. It is aimed in the appended claims to cover all such changes and modifications as fall within the true spirit and scope of the present invention.

What is claimed as new and desired to be secured by Letters Patent of the United States is:

1. A support for mounting a plurality of electrical devices in different positions at an elevated location on a pole, comprising a channel bracket having a plurality of mounting surfaces facing in different directions, a plurality of intermediate channel members nested within and adjustably attached to said bracket, and a plurality of feet each of which are pivotally attached to a different one of said members for engaging said pole.

2. A support for mounting a plurality of electrical devices in different positions at an elevated location on a pole, comprising a bracket having a plurality of mounting portions facing in different directions, a plurality of support members, means for adjustably attaching said members to said bracket in a plurality of selective positions, a plurality of feet each of which is pivotally attached to a different one of said support members, screw means for fixedly securing said feet against said pole, a flexible band for engaging a portion of said pole, and means including clamping bolts for pivotally attaching the ends of said band to each of said support members, said support members being disposable in selected positions on said bracket to cause the clamping force developed by the band assembly and the clamping means to substantially reinforce the force of the screw means regardless of the size of said pole.

3. A support for mounting a plurality of electrical devices in different positions at an elevated location on a pole, comprising a bracket having at least one support surface for at least one of said devices, a pair of intermediate support means, means for adjustably attaching said support means to said bracket in one of a plurality of preselective positions, each of said support means including a pair of pivotal means, a pair of feet each of which is pivotally attached to a different one of one of said pivotal means for spacing said member from said pole, and a pair of clamping means each of which is pivotally attached to a different one of the other of said pivotal means for causing said feet to be borne against said pole.

4. A support for mounting a plurality of electrical devices in different positions at an elevated location on a pole, comprising a bracket having at least one support surface for at least one of said devices, a pair of intermediate support means adjustably attached in one of a plurality of preselective positions to said bracket, each of said support means including a pair of pivotal means, a pair of feet each of which is pivotally attached to a different one of one of said pivotal means for spacing said member from said pole, means for engaging conformably a portion of said pole, and a pair of clamping means each of which is pivotally attached to a different one of the other of said pivotal means for interconnecting the ends of said engaging means with said pivotal means.

5. A support for mounting a plurality of electrical devices in different positions at an elevated location on a pole, comprising a bracket having a plurality of mounting surfaces facing in different directions, first and second pivot assemblies adjustably carried by said bracket, each of said assemblies including at least one pivot means, means mounted upon each assembly for pivotal movement relative thereto for engagement with said pole, a band assembly for engaging said pole, and means mounted upon each assembly for pivotal movement relative thereto and for interconnecting said band assembly with said bracket.

6. A support for mounting at least one electrical device at an elevated location on a pole, comprising a bracket having a center portion and first and second end portions disposed on opposite sides of the pole, said bracket including at least one mounting surface, first support means spaced from said pole and selectively movable along said bracket into a plurality of positions disposed intermediate said center portion and said first end portion, second support means spaced from said pole and selectively movable along said bracket between different positions disposed intermediate said center portion and said second end portion, means for selectively securing said first and second support means to said bracket in selected ones of said positions in order to adapt the bracket for use with poles of different diameter, and means attached to said support means for attaching said bracket to said pole.

7. A support for mounting an electrical device on a pole, said support comprising a bracket having first and second supporting portions, a first supporting member spaced from said pole, means for connecting said first supporting member to selected locations on said first supporting portion, a second supporting member spaced from said pole, means for connecting said second supporting member to selected locations on said second supporting portion, and means connected to said first and second supporting members for supporting said bracket from said pole.

8. A support for mounting an electrical device on a pole, said support comprising a bracket having a center portion and first and second supporting portions extending angularly outward from said center portion to define a V-shaped bracket partially embracing the pole, a first supporting member spaced from said pole, means for connecting said first supporting member to selected locations on said first supporting portion, a second supporting member spaced from said pole, means for connecting said second supporting member to selected locations on said second supporting portion, an adjustable band assembly partially engaging said pole and having its ends respectively attached to said first and second supporting members, and pole engaging feet pivotally and respectively attached to said first and second supporting members.

9. A support for mounting an electrical device upon a pole, said support comprising a bracket having first and second supporting portions dimensioned partially to embrace the pole, first and second support structures respectively spaced from said pole, means for securing said first support structure to said bracket at selected positions displaced longitudinally of said first supporting portion, means for securing said second support structure to said bracket at selected positions displaced longitudinally of said second supporting portion, an adjustable band assembly dimensioned to partially encircle said pole and having its opposed ends respectively attached to said first and second support structures, and a pole engaging foot pivotally mounted upon each of said support structures, said adjustable band assembly and said securing means being operable to permit attachment of said bracket to poles of different diameter.

10. The support of claim 6 wherein each of said support means includes a channel member and pivotal means mounted to the channel member and wherein said attaching means includes pole engaging feet and a band assembly having a pair of ends, one foot and one assembly end being attached to one of said pivotal means and the other foot and other assembly end being attached to the other of said pivotal means.

11. The support of claim 6 wherein each of said support means includes a pivotal means wherein said attaching means includes pole engaging feet and a band assembly having a pair of ends, one foot and one assembly end being attached to one of said pivotal means and the other foot and other assembly end being attached to the other of said pivotal means.

References Cited in the file of this patent

UNITED STATES PATENTS

| | | |
|---|---|---|
| 1,915,715 | Bodendieck | June 27, 1933 |
| 2,500,711 | Serra | Mar. 14, 1950 |
| 2,696,357 | Elmer | Dec. 7, 1954 |
| 2,720,016 | Johannsen | Oct. 11, 1955 |

UNITED STATES PATENT OFFICE

CERTIFICATE OF CORRECTION

Patent No. 2,883,136                                April 21, 1959

Burton M. Smalley

It is hereby certified that error appears in the printed specification of the above numbered patent requiring correction and that the said Letters Patent should read as corrected below.

Column 6, line 75, for "adapted" read -- adapter --; column 9, line 24, for "desire" read -- desired --; column 10, line 23, after "thereto" insert -- and --.

Signed and sealed this 25th day of August 1959.

(SEAL)
Attest:

KARL H. AXLINE                                              ROBERT C. WATSON

Attesting Officer                                          Commissioner of Patents